Dec. 28, 1926.
T. CHAMPLIN
KNIFE
Filed June 21, 1926
1,611,886
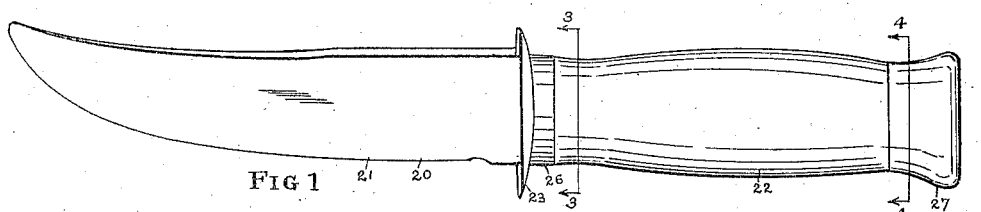
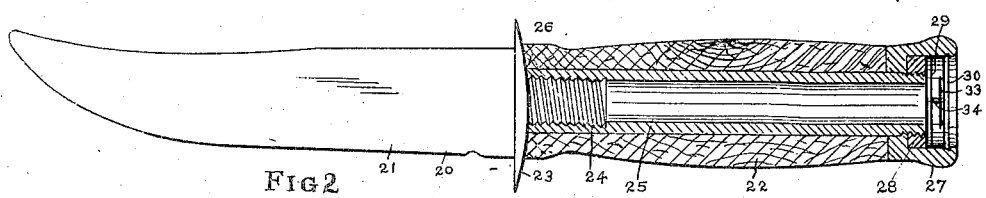
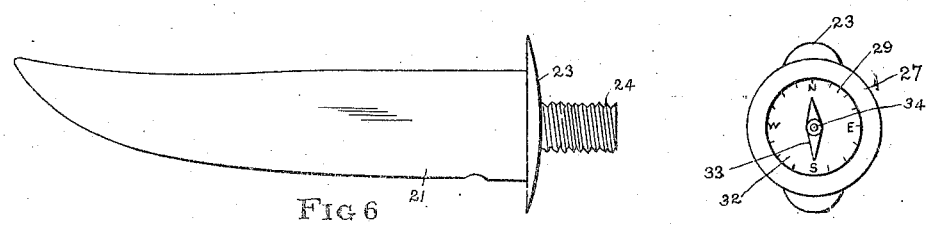
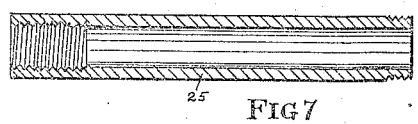
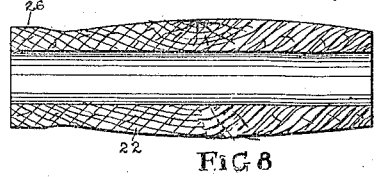
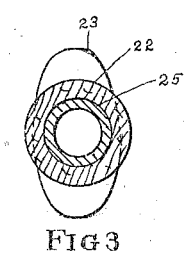
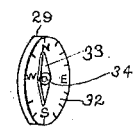
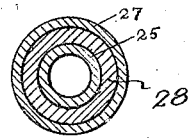
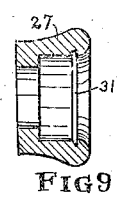
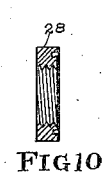
Inventor
TINT CHAMPLIN.
By Clarence E. Walker.
His Attorney Patented Dec. 28, 1926.

1,611,886

UNITED STATES PATENT OFFICE.

TINT CHAMPLIN, OF LITTLE VALLEY, NEW YORK.

KNIFE.

Application filed June 21, 1926. Serial No. 117,318.

This invention relates to an improvement in a knife, and more particularly in a knife having embedded in its handle a compass, and in the manner of so mounting the compass in the knife handle that its needle is in no way affected by the close presence of the steel blade of the knife.

It is a well-known fact that the presence of steel will affect the action of a compass needle, and that as a result the compass is not reliable. A compass is a very important and necessary part of a hunter's equipment and for that reason it is here shown and described as mounted in the handle of a hunting knife. However, such a combination is here selected solely as an illustration and not as a limitation of this invention.

Other objects of this invention will appear from a consideration of the following description taken in connection with the drawings which form a part thereof, and in which Fig. 1 is a side elevation of a hunting knife having embedded in its handle a compass;

Fig. 2 is similar to Fig. 1, except that the handle is shown in section;

Figs. 3 and 4 are cross-sectional views taken along the lines 3—3 and 4—4 of Fig. 1;

Fig. 5 is an end elevation of the knife showing the compass in the handle;

Fig. 6 is a side elevation of the blade of the knife;

Fig. 7 is a sectional view of the tube which extends through the handle;

Fig. 8 is a sectional view of the handle;

Fig. 9 is a sectional view of the cup in which the compass is seated;

Fig. 10 is a sectional view of the nut by which the cup is secured in place; and Fig. 11 is a perspective view of the compass.

Referring to the drawings, the reference numeral 20 is employed to designate a hunting knife having a blade 21 and handle 22. The blade 21 has at its inner end a shield 23 and a tang 24, which is externally threaded. A tube 25 of brass internally threaded at one end is screwed onto the tang 24 and bears against the shield 23. Slipped over the tube 25 and bearing against the shield 23 is a grip 26, which may be of wood as shown in the drawing, or of fiber or composition if desired.

The end of the tube projects beyond the grip 26 and over this projecting end is placed a cup 27 of aluminum which is held in place by a nut 28 engaging the externally threaded end of the tube 25. The cup 27 thus clamps the grip 26 securely in position on the tube 25 and against the shield 23. In addition to this function the cup 27 also acts as a compass chamber to receive a compass 29 held in place by a bezel 30, which engages a groove 31 in the inner wall of the cup. The compass comprises a dial 32, a stem 34, and a magnetic needle 33 mounted to turn on said stem over said dial. The needle and dial can be observed by looking at the end of the handle 22, as in Fig. 5.

By reason of the use of the brass tube 25 and the aluminum cup 27, in which the compass 29 is located, the needle 33 is protected from any influence by the steel blade 21 and the compass gives a true reading, and it is to this feature that this application is particularly directed. Nevertheless I am not to be expressly limited thereto since other embodiments of this invention might be made without departing from the spirit and scope thereof, as set forth in the following claims.

Having thus set forth my invention, what I claim as new and for which I desire protection by Letters Patent is:

1. A handle for a knife comprising a brass tube fixed to the tang of the knife blade, a grip surrounding said tube, and an aluminum cup fixed on said tube within which is mounted a compass.

2. Means for protecting a compass in the handle of a knife from the influence of the knife blade, including an aluminum cup carried by the knife handle within which cup said compass is mounted.

3. A handle for a knife comprising a tube fixed to the tang of the knife blade, a grip surrounding said tube, and a cup fixed on said tube at the end of said grip, within which cup is mounted a compass, said tube and cup being of material which will protect the compass from the influence of the knife blade.

In testimony whereof I have affixed my signature.

TINT CHAMPLIN.